United States Patent [19]

Martineau

[11] 3,928,006
[45] Dec. 23, 1975

[54] DEVICE FOR SIGNALLING DIRTY FILTERS
[76] Inventor: Richard P. Martineau, 429 Elm St., Keene, N.H. 03431
[22] Filed: Aug. 29, 1974
[21] Appl. No.: 501,610

[52] U.S. Cl. .......... 55/274; 55/DIG. 34; 200/81.9 R; 340/239 F
[51] Int. Cl.² ................. B01D 35/14; G08B 21/00
[58] Field of Search ............... 340/239 F; 200/81.9; 55/270, 274, DIG. 34, 210, 211, 212, 215

[56] References Cited
UNITED STATES PATENTS
2,580,642   1/1952   Beede ................................ 55/211
2,789,175   4/1957   Mahr ............................. 340/239 F Primary Examiner—John W. Caldwell
Assistant Examiner—Daniel Myer
Attorney, Agent, or Firm—Raymond N. Matson

[57] ABSTRACT

As a filter becomes dirty in a circulating air system such as found in furnaces and air conditioners, its pores become clogged providing a higher resistance to air flow therethrough and tends to bulge when the blower is operative. A position sensitive electrical switch is positioned to detect a predetermined extent of filter bulge thereby to operate an end-of-filter-life signal.

1 Claim, 5 Drawing Figures

DEVICE FOR SIGNALLING DIRTY FILTERS

This invention relates to operation of filters in furnaces and the like, and more particularly to signalling devices for indicating the end of useful life of such filters.

Operating efficiency of furnaces or air conditioners is significantly affected when the air flow through a heat exchanger is not retained at an optimum value. However it is necessary to employ filters to take the dust out of circulating air and after an undetermined period of operating time these filters become dirty and clogged thereby reducing the flow of air through the heat exchanger. If these dirty filters are not replaced before they unduly restrict air circulation, the system efficiency is significantly decreased.

Problems are encountered in determining an optimum life span of the filters, because of the variable conditions of dust encountered. Even should the home owner layman understand the need to change a filter to attain better operating efficiency, it is difficult to determine by visual inspection when the filter should be replaced.

There is no satisfactory simple and inexpensive filter automatic end-of-life detection means known in the art that will operate in the natural environment where the filters are found. For example, photocell detection of the filter condition produces erratic results, being more sensitive to color of the dirt than the extent of the dirt on the filter. Systems of measuring air flow characteristics of the system are expensive and critical in operation.

Accordingly it is a main object of the present invention to improve the efficiency of operation of circulating air systems by automatically signaling the end-of-life of a filter.

Another object of this invention is to provide a simple, effective device for signalling automatically the end-of-life of furnace filters, and the like.

Other objects and advantages of the present invention will become apparent during the course of the following description.

In the drawing, I have shown one embodiment of the invention. In this showing:

Figure 1:
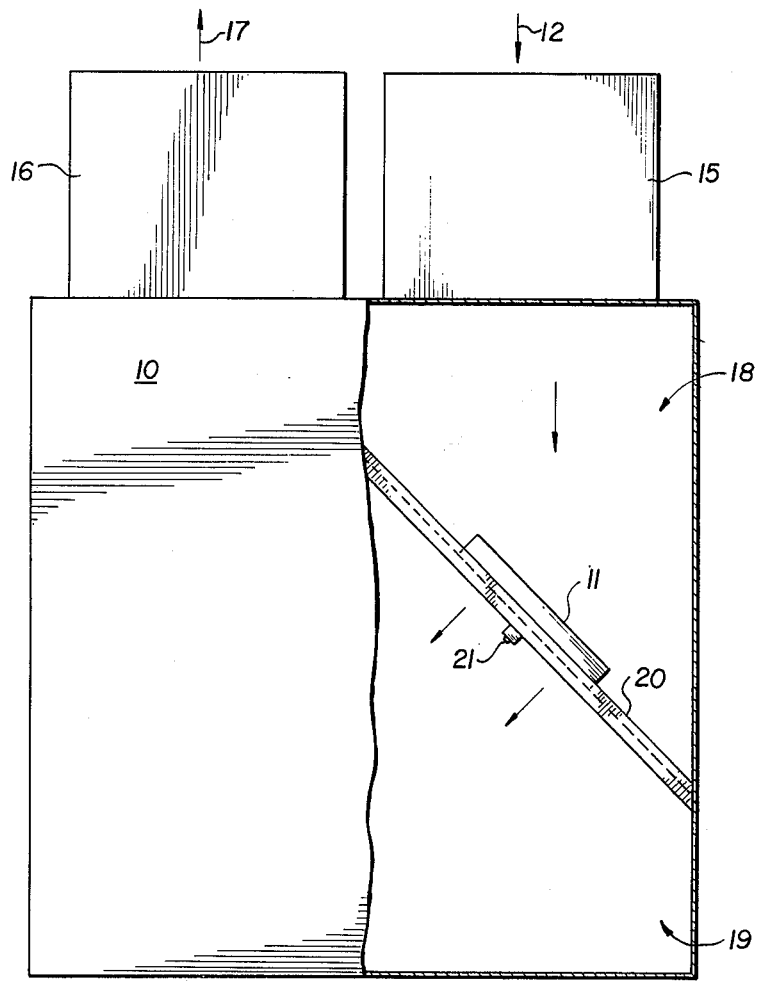
FIG. 1 is an elevation side view, partly broken away, of a typical air flow furnace configuration having a filter.

Referring to the drawings, and particularly FIG. 1, a furnace 10 is cut away to show a filter 11 in an air flow path from some piping source 12 shown by an arrow which enters the box 15 which may house for example a blower to keep air flowing through the furnace to the heat exchanger box 16 and output pipes shown by arrow 17. As the air flows through the furnace from compartment 18 to compartment 19 all the air flows through an aperture (not shown) over which the filter 11 is placed to thereby remove the dust, dirt, lint, etc. that may be circulated by an air flow system.

Figure 3:
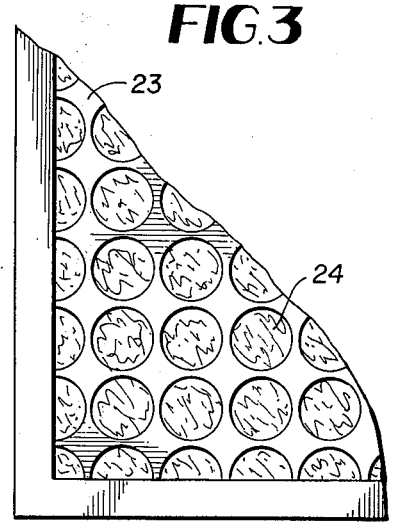
FIG. 3 is a partial plan view of a filter.

In accordance with the present invention a mounting framework such as 20 is provided for holding the filter and disposing adjacent it in a spaced position at the center of the filter a sensor 21 which will be actuated when the filter bows out beyond a predetermined limit. The filter which is generally constructed as shown in FIG. 3 with a mounting border section 22 has on opposite sides retaining covers 23 with apertures 24 for permitting air flow through a fibrous inner membrane (not shown) which is held in place by the opposed and separated covers 23. The covers 23 are thin and flexible and will tend to sag or bend in the central portion of the filter away from the framework 22. This feature is used in this invention, since as dust, lint and dirt accumulates in the filter fibers it provides higher resistance to the air flow through it. Normally the air should flow freely enough to prevent loading the air blower section 15 and to provide optimum heat exchange in box 16. Therefore the filters offer a minimum resistance to the free flow of air therethrough when first installed. Thus, if the filter is mounted without intermediate support of its centermost region it will tend to provide a sail effect and sag in some proportion to the amount of dirt it accumulates because of increased resistance to the air flow therethrough provided by blower section 15. Accordingly for a standard filter construction it may be determined by experimentation that amount of sag displacement which indicates useful end of filter life. That is to say, if a filter so impedes air flow in the system that efficiency is significantly reduced, the filter should be replaced. Conversely, filters are expensive and should be used as long as possible while optimum heat transfer efficiency is produced by ample air flow and proper blower loading. Thus, the spacing of the sensor element 21 from the filter mounting plane may be adjusted for a proper showing of end of life to fit the characteristics of the sensor 21, which in one simple form is simply a sensitive electric switch.

Figure 2:
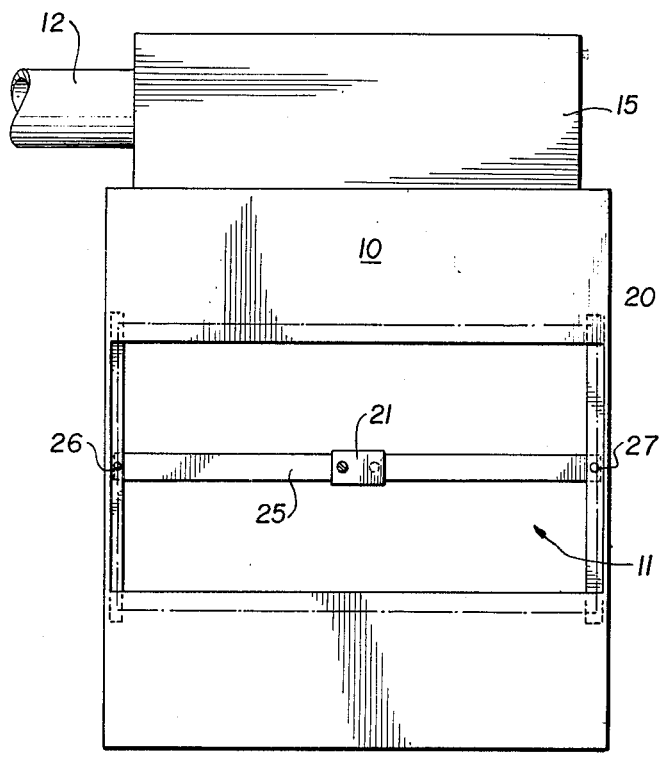
FIG. 2 is a rear view of the furnace, showing in phantom view the filter-mount arrangement.
Figure 4:
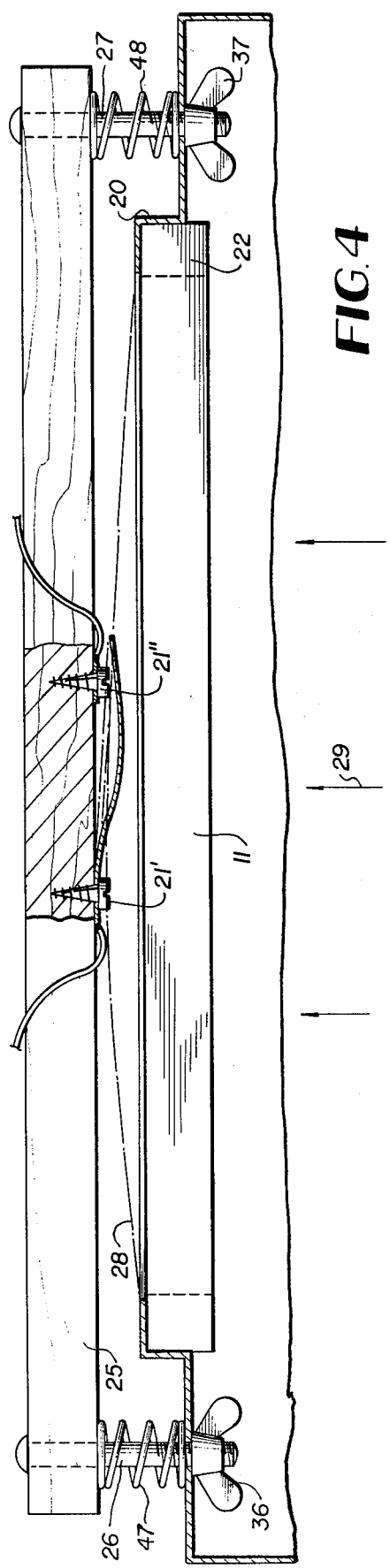
FIG. 4 is a side view, partially in section of a filter mount assembly as provided by this invention incorporating a device for signalling end-of-filter life.

To understand the mounting relationship of the filter 11 and sensor 21 the views of FIGS. 2 and 4 may be considered. Thus, the framework 20 surrounds the filter border section 22 and holds the filter 11 in place so that the central portion is free to bow upwardly as shown in phantom view 28 in FIG. 4 whenever air flow as indicated at arrows 29 encounters increased air flow resistance of the filter 11 because of accumulated dirt.

Thus, a simply normally opened sensitive switch with a leaf spring 21' can be caused to close its contacts whenever the filter reaches a predetermined degree of dirtiness. For, adjusting this actuation point, a pair of adjustment bolts 26, 27 having wing nuts 36, 37 and surrounding springs 47, 48 hold the sensor mounting member 25 parallel with and spaced from filter 11 so that the spacing therebetween may be selected between desired limits. It is therefore evident that the wing nuts 36, 37 may be adjusted to just close switch reed leaf 21' on contact 21'' with a filter that is adjudged to have reached its useful end of life or a calibrated test member of similar air flow resistance. Also variations in the adjustment may be made for different brands of structures that vary somewhat in the degree of bow attained when they have reached the end of life.

Figure 5:
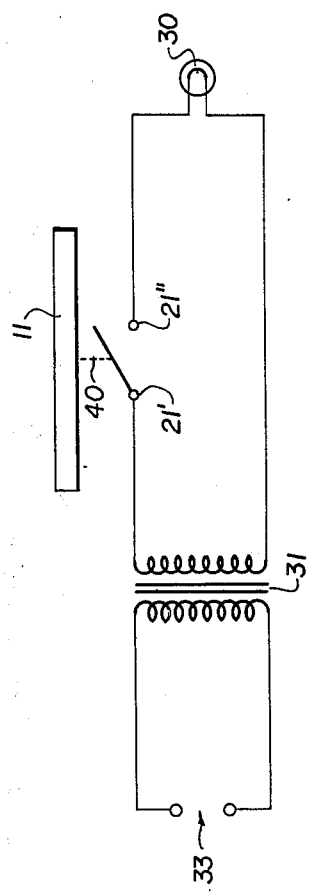
FIG. 5 is a schematic drawing of the signalling device afforded by the invention.

With an electrical switch sensor a simple signal circuit as shown in FIG. 5 may comprise lamp 30 connected through normally open switch at 21 to a transformer 31 connected by line terminals 33 to the furnace line supply. Whenever filter 11 bows from air resistance enough to overcome spring switch member 21 as indicated by dotted line 40, the lamp 30 will light. Thus, it may be recognized that the invention simply provides an end-of-life dirty filter signalling device that operates from conditions encountered normally in a circulating air furnace for example and requires only the mounting of a simple electrical switch and lamp signal circuit, or some other equivalent sensor that is actuated by the bowing of the filter from the furnace blower when it becomes dirty enough to near the end of useful life.

It is to be understood that the form of my invention herewith shown and described is to be taken as a preferred example of the same, and that various changes in the shape, size and arrangement of parts may be resorted to without departure from the spirit of the invention or the scope of the subjoined claims.

What is claimed is:

1. A signalling device for automatically designating the end of useful filter life in a circulating air system such as a furnace, comprising in combination, a circulating air passageway, a blower forcing a flow of air through said passageway, a substantially planar filter arranged in said passageway to intercept the flow of said air, rigid peripheral mounting structure for said filter confining it in place at the edges and permitting the unsupported central portion of said filter to flex in the direction of air flow therethrough, and means including a switch for signalling end of life positioned for actuation by the crown of the bowing movement of said central portion after it is flexed a predetermined distance as a result of increased resistance to air flow when it has become partially clogged by retention of dust and the like, said switch having a mounting structure supporting said switch adjacent said filter mounting structure and having adjusting means thereon for establishing said predetermined distance for relatively positioning said two mounting structures.

* * * * *